(12) United States Patent
Pring et al.

(10) Patent No.: US 7,306,668 B2
(45) Date of Patent: **\*Dec. 11, 2007**

(54) KAOLIN PIGMENT HAVING HIGH BRIGHTNESS AND NARROW PARTICLE SIZE DISTRIBUTION AND METHOD OF PREPARATION THEREFOR

(75) Inventors: Graham Pring, Lostwithiel (GB); Christopher R. L. Golley, St. Austell (GB)

(73) Assignee: Imerys Pigments, Inc., Roswell, GA (US)

( * ) Notice: Subject to any disclaimer, the term of this patent is extended or adjusted under 35 U.S.C. 154(b) by 16 days.

This patent is subject to a terminal disclaimer.

(21) Appl. No.: 10/508,831

(22) PCT Filed: Jan. 29, 2003

(86) PCT No.: PCT/US03/01063

§ 371 (c)(1),
(2), (4) Date: Sep. 23, 2004

(87) PCT Pub. No.: WO03/089524

PCT Pub. Date: Oct. 30, 2003

(65) Prior Publication Data

US 2005/0178514 A1 Aug. 18, 2005

Related U.S. Application Data

(60) Provisional application No. 60/372,439, filed on Apr. 16, 2002.

(51) Int. Cl.
*C04B 14/10* (2006.01)
*D21H 21/28* (2006.01)

(52) U.S. Cl. ............... 106/486; 106/487; 106/488; 162/135; 209/5; 209/7

(58) Field of Classification Search ............... 162/135; 106/486, 487, 488; 209/5, 7; 501/148
See application file for complete search history.

(56) References Cited

U.S. PATENT DOCUMENTS 3,765,921 A 10/1973 Puskar
3,857,781 A * 12/1974 Maynard .................. 209/5
4,227,920 A * 10/1980 Chapman et al. ........... 209/5
5,112,782 A 5/1992 Brown et al.
5,454,865 A * 10/1995 Ginn et al. ................ 106/486
5,522,924 A 6/1996 Smith et al.
5,624,488 A 4/1997 Forbus et al.
5,685,900 A * 11/1997 Yuan et al. ................ 106/487
6,068,693 A 5/2000 Garforth et al.
6,615,987 B1 * 9/2003 Greenhill et al. .......... 106/486
6,808,559 B2 * 10/2004 Golley et al. ............. 106/486
6,893,536 B2 * 5/2005 Ilmonen et al. ........... 162/135
2005/0098283 A1 * 5/2005 Golley et al. ............. 106/486
2006/0102304 A1 * 5/2006 Nutbeem et al. .......... 162/135

FOREIGN PATENT DOCUMENTS

WO WO 00/08106 2/2000
WO WO 00/32699 6/2000

* cited by examiner

*Primary Examiner*—Helene Klemanski
(74) *Attorney, Agent, or Firm*—Finnegan, Henderson, Farabow, Garrett & Dunner, L.L.P.

(57) ABSTRACT

The present invention provides high brightness kaolins exhibiting a Brightness (GE) of at least about 90.0. The hydrous kaolin pigments of the present invention may also have, inter alia, a steepness index ($d_{30}/d_{70} \times 100$) of at least about 39 and/or a titania concentration less than or equal to about 0.40% by weight of the pigment on a dry basis. (062) The hydrous kaolin pigment is produced by a process comprising: a) forming an aqueous suspension of a hydrous kaolin clay; b) forming a primary product by subjecting the suspension to classification or a combination of classification and griding; c), separating the kaolin from impurities by selective flocculation; and d) defining the separated kaolin. (063) The hydrous kaolins of the present invention allow coated papers to be produced at high brightness while maintaining acidic conditions on a paper machine. The invention pigmets exhibit brightness levels unexpectedly higher, e.g., about 2 to about 2.5 or more (GE) units brighter, than exhibited by previous high brightness hydrous kaolin pigments, without sacrificing other important paper properties. Paper coated with the inventive pigmants have high brightness, high whiteness, and high fluorescence levels. The present invention encompasses these pigments, compositions comprising them, and any application in which they are used.

38 Claims, 2 Drawing Sheets

Pigment A: Engineered particle size distribution
Pigment B: Engineered particle size distribution & selective flocculation Pigment A: Engineered particle size distribution
Pigment B: Engineered particle size distribution & selective flocculation

KAOLIN PIGMENT HAVING HIGH BRIGHTNESS AND NARROW PARTICLE SIZE DISTRIBUTION AND METHOD OF PREPARATION THEREFOR

RELATED APPLICATION

This PCT application claims the benefit of priority under 35 U.S.C. § 119(e) to U.S. Provisional Application No. 60/372,439, filed Apr. 16, 2002, entitled "KAOLIN PIGMENT HAVING HIGH BRIGHTNESS AND NARROW PARTICLE SIZE DISTRIBUTION AND METHOD OF PREPARATION THEREFOR," the disclosure of which is incorporated by reference herein in its entirety.

FIELD OF THE INVENTION

The present invention relates to very high brightness kaolin pigment compositions, their production, and use. The pigments of the invention may be used wherever kaolin pigments are used, such as in high brightness paper coating applications.

BACKGROUND OF THE INVENTION

High brightness paper coating applications demand high brightness pigments. Kaolin-based pigments are widely used in paper coating applications because of their desirable qualities, such as fiber coverage, paper gloss, and print gloss. High brightness kaolins are known in the art. For example, high brightness American, English, and Brazilian kaolins such as Capim DG have been used in paper coating applications. Despite advances that have led to improvements in kaolin pigment properties, however, prior art kaolin pigments lack the combination of brightness and particle size distribution and other properties required to further enhance high brightness paper coating applications. Consequently, some paper manufacturers use mixtures of kaolin and calcium carbonate pigments to coat or fill high brightness paper to achieve targeted high brightness levels.

Unfortunately, such mixtures increase the expense of high brightness paper. They also give rise to certain operational challenges. For instance, the pH at which paper coating machines operate must be kept neutral to alkaline to avoid degrading the calcium carbonate. Kaolins, however, require an acidic operating environment for the same reason. Changing the pH of a paper coating machine's operating conditions constitutes a major step with substantial costs, projected down-time, and risks in initial operating efficiency. Therefore, manufacturers of high brightness paper demand increasingly brighter kaolins that do not require calcium carbonate (or other pigment) additives to achieve target brightness levels. Such pigments must not only exhibit high brightness, but also preferably low titania or titania impurity levels, high shape factor, and other desirable kaolin qualities that render them useful in high speed paper coating applications. The present invention meets these and other needs.

SUMMARY OF THE INVENTION

The present invention provides high brightness kaolins exhibiting a Brightness (GE) of at least about 90.0. The hydrous kaolin pigments of the present invention may also have, inter alia, a steepness index (d.30/d.70×100) of at least about 39. The hydrous kaolin pigments of the present invention may also have a titania concentration less than or equal to about 0.40% by weight of the pigment on a dry basis.

The hydrous kaolin pigments of the present invention allow coated papers to be produced at high brightness levels while maintaining acidic conditions in a paper machine. The brightness levels of paper sheets coated with the inventive pigments are unexpectedly higher, e.g., about 2 to about 2.5 or more (GE) units brighter, than the brightness levels exhibited by substrates coated with previous high brightness hydrous kaolin pigments, without sacrificing other important paper properties, such as gloss and smoothness. Paper coated with the inventive pigments may also exhibit higher whiteness and higher fluorescence levels than was previously thought to be achievable using previously available high brightness hydrous kaolins.

The present invention encompasses these pigments, compositions comprising them, and any application in which they are used. Such compositions include, but are not limited to, paper filler and paper coating compositions. Such applications include, but are not limited to, paper coating formulations comprising the inventive pigments. Such formulations may be used to advantage in, e.g., high speed paper coating machines.

The hydrous, kaolin pigment of the present invention may be produced by a process comprising the following steps:
(a) forming an aqueous suspension of a hydrous kaolin clay;
(b) forming a primary product by subjecting the suspension to classification or a combination of classification and grinding;
(c) separating the kaolin from impurities by selective flocculation; and
(d) defining the separated product,
wherein the product of the process is a hydrous kaolin pigment having the stated characteristics.

BRIEF DESCRIPTION OF THE DRAWINGS

FIG. 1 also shows an improvement in Brightness of a pigment of the present invention (kaolin A) brought about by selective flocculation (kaolin B).

FIG. 2 also depicts an improvement in paper Brightness of for a paper coated with a pigment of the present invention (kaolin A) brought about by selective flocculation (kaolin B).

DETAILED DESCRIPTION OF THE INVENTION

Figure 1:
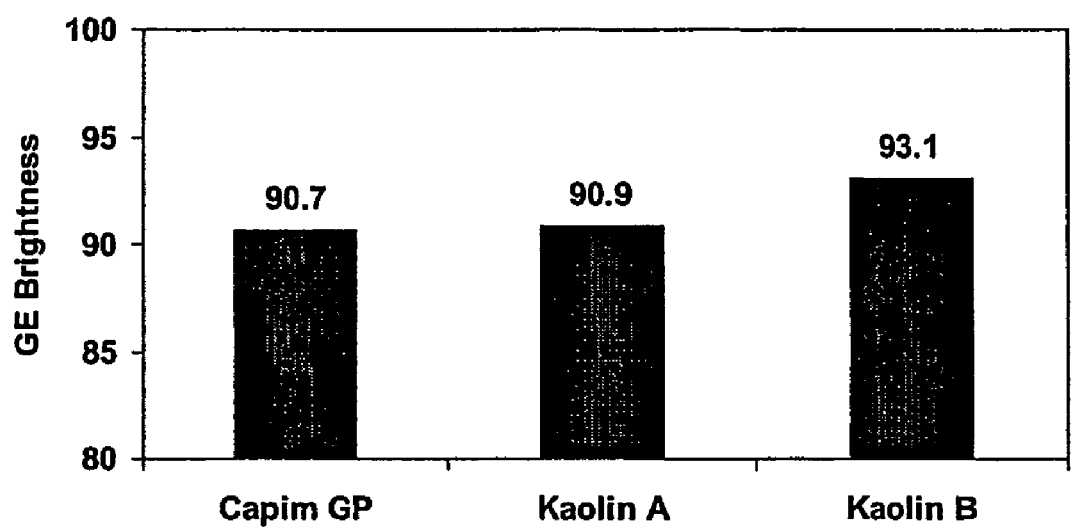
FIG. 1 depicts a comparison of pigment Brightness (GE) values for a prior art Brazilian kaolin pigment (Capim GP) and a pigment (kaolin A) of the present invention of comparable particle size distribution.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The kaolin pigments of the present invention comprise hydrous kaolins and have at least the following characteristics.

Brightness (GE): at least about 90.0, with additional embodiments exhibiting brightness of at least about 91.0, at least about 92.0, at least about 93.0, at least about 93.5, at least about 94.0.

Additionally, the hydrous kaolin pigments of the present invention may also have one or more of the following characteristics:

Steepness Index ($d_{30}/d_{70} \times 100$): at least about 39, with one embodiment between about 39 and about 45, and another embodiment being between about 41 to about 45;

A titania concentration less than or equal to about 0.40% by weight of the pigment on a dry basis, with additional embodiments being less than or equal to about 0.35%, less than or equal to about 0.30%, less than or equal to about 0.20%, and less than or equal to about 0.15%;

A particle size distribution (p.s.d.) such that about 80% to about 94%, with additional embodiments being from about 85% to about 92%, and about 85% to about 90%, by weight on a dry basis, are less than 2 μm;

A p.s.d. such that about 2% to about 15%, with additional embodiments being from about 2% to about 10%, and from about 2% to about 8%, by weight on a dry basis, are less than 0.25 μm;

A Brookfield viscosity, measured at 20 rpm and at less than or equal to about 68% solids: about 200 to about 800 centipoise, advantageously about 250 to about 500 centipoise; and/or A Hercules viscosity parameter, measured at 18 dynes and at less than or equal to about 68% solids: about 150 rpm to about 800 rpm, advantageously about 400 rpm to about 800 rpm.

Unless otherwise expressly indicated, the numerical parameters used in the present specification and attached claims are approximations, understood as being modified by the term "about." All percentages listed are by weight on a dry basis, unless otherwise indicated.

GE Brightness, as used herein for measuring pigment brightness, is defined in TAPPI Standard T457 and refers to the percentage reflectance to light of a 457 nm wavelength according to methods well known to those of ordinary skill in the art.

The titania concentration, as used herein, may be titania in all its forms, including but not limited to, rutile and anatase. Anatase has a titania crystal structure in which some iron atoms replace titanium in the crystal lattice. The iron imparts a brown, tan, or cream color to the mineral, which can reduce brightness in white pigments.

Particle size, as used herein, e.g., in the context of particle size distribution, is expressed in terms of equivalent spherical diameter. Particle size properties referred to in the present application are measured in a well-known manner by sedimentation of the particle material in a fully dispersed condition in an aqueous medium using a SEDIGRAPH 5100 machine as supplied by Micromeretics Corporation. Such a machine provides measurements and a plot of the cumulative percentage by weight of particles having a size, referred to in the art as "equivalent spherical diameter" (e.s.d.), less than the given e.s.d. values. The mean particle size $d_{50}$, for example, is the value determined in this way of the particle e.s.d. at which there are 50% by weight of the particles which have an e.s.d. less than the given $d_{50}$ value.

The particle size distribution ranges stated above for pigments of the present invention represent a balance of various paper properties. One of ordinary skill in the art would be able to select from within the stated ranges, or select particle size distributions outside the stated ranges, in accordance with an application's particular product needs and other relevant considerations.

Steepness: ($d_{30}/d_{70} \times 100$), as used herein, refers to the steepness (or narrowness) of a sample's p.s.d. curve. This, in turn, refers to the slope of the p.s.d. curve of the particulate kaolin according to the present invention. Steepness, as used herein, is measured as 100 times the ratio of $d_{30}$ to $d_{70}$, where $d_{30}$ is the value of the particle e.s.d. at which there are 30% by weight of the particles which have an e.s.d. less than the given $d_{30}$ value, and $d_{70}$ is the value of the particle e.s.d. at which there are 70% by weight which have an e.s.d. less than the given $d_{70}$ value, both obtained from the SEDIGRAPH 5100 measurement described above.

Viscosity, as used herein, is a measure of a kaolin clay's rheological properties. More particularly, viscosity is a measure of a clay's resistance to changes in flow. Those having ordinary skill in the art are familiar with ways of measuring viscosity, which include Brookfield and Hercules viscosities.

Brookfield viscometers provide a measure of a clay slurry's low shear viscosity. Low shear viscosity is expressed in units of centipoise. One centipoise equals one centimeter-gram-second unit. (One centipoise is one hundredth ($10^{-2}$) of a poise.) Thus, all other things being equal, a 100 centipoise sample has a lower low shear viscosity than a 500 centipoise sample.

In contrast, Hercules viscometers provide a measure of a clay slurry's high shear viscosity. Hercules viscosity is typically measured by placing a cylinder (bob) of appropriate diameter and length (typically the A-bob) into a sample clay slurry. Hercules viscosities of various samples can be compared by holding constant the percent solids concentration of the sample, the bob size, and the applied force. The Hercules viscometer applies a force to the bob which causes it to spin at a controlled accelerating rate. As the viscometer increases the bob spin rate, the viscous drag on the cup increases. Clay slurries with poor high shear rheology will exert the maximum measurable force on the cup at a lower bob rpm than clay slurries with "good" high shear rheology. Hercules viscosity, therefore, can be expressed in terms of bob spin rates, or revolutions per minute (rpm). This parameter (bob spin rate, in rpm) is used to express Hercules viscosity herein. A "dyne endpoint" is an indication of very low Hercules viscosity. A dyne endpoint is reached when the bob reaches its maximum rpm before the maximum measurable force is exerted on the cup.

The gloss of a coated paper surface, as used herein, may be measured by means of a test laid down in TAPPI Standard No. 480 ts-65. The intensity of light reflected at an angle from the surface of the paper is measured and compared with a standard of known gloss value. The beams of incident and reflected light are both at an angle of 75° to the normal of the paper surface. The results are expressed as TAPPI gloss units.

Coating color solids, as used herein, is a measure of the total level of solid material in a pigment formulation applied to a base paper during a coating process.

Paper brightness, as used herein, is defined as the ratio of the reflectance of an opaque pad of test sheets, using light with a wavelength of 457 nm, compared to the reflectance of the perfect diffuser. The measurements made herein used an Elrepho Datacolor 3300 spectrophotometer according to ISO 2470.

Fluorescence, as used herein, occurs only when the coating color formulation contains an optical brightening agent (oba). Fluorescence occurs when the oba molecule absorbs ultraviolet radiation present in daylight and re-emits the radiation in the visible region of the spectrum as fluorescence. Fluorescence helps to make paper appear whiter, brighter, and bluer in shade. The amount of visible radiation emitted as fluorescence by the oba can be affected by the pigment in the coating. Impurities in pigments, especially kaolin pigments, can interfere with fluorescence by absorbing radiation otherwise emitted as fluorescence. Fluorescence may be measured as the difference between paper brightness with and without ultraviolet light in the light source. Fluorescence measurements expressed herein were made using an Elrepho Datacolor 3300 spectrophotometer to measure the paper brightness both with and without ultraviolet light present in the light source.

Opacity, as used herein, is a measure of percent reflectance of incident light off a coated substrate. The opacity of a sample of paper can be measured by means of an Elrepho Datacolor 3300 spectrophotometer using a wavelength appropriate to opacity measurement. First, a measurement of the percentage of the incident light reflected is made with a stack of at least ten sheets of paper over a black cavity ($R_{infinity}$). The stack of sheets is then replaced with a single sheet of paper, and a second measurement of the percentage reflectance of the single sheet on the black cover is made (R). The percentage opacity is then calculated from the formula: Percentage opacity=$100 \times R/R_{infinity}$. The standard test method is ISO 2471.

CIE Whiteness, as used herein, is a method for measuring the whiteness of the paper as defined by the Commission for Internationale de I'Eclarage, the international commission on illumination, in standard test method ISO 11475 (Paper and board: Determination of CIE Whiteness D65/10°).

The hydrous kaolin pigment of the present invention may be produced by a process comprising the following steps:

(a) forming an aqueous suspension of a hydrous kaolin clay;
(b) forming a primary product by subjecting the suspension to classification or a combination of classification and grinding;
(c) separating the kaolin from impurities by selective flocculation; and
(d) defining the separated product, wherein the product of the process is a hydrous kaolin pigment having the stated characteristics.

The aqueous suspension may be formed from crude hydrous kaolin clay. Any suitable hydrous kaolin feed clay capable of providing a product having at least the minimum stated properties may serve as the crude feed. Advantageously, the crude feed may be derived from Brazilian kaolins, more particularly kaolins from the Rio Capim region of Brazil.

Typically, the aqueous suspension is formed by blunging the crude feed. Blunging mixes the crude feed with water in a high-energy mixer, known by those skilled in the art as a blunger. A sufficient amount of water is added during blunging to form an aqueous suspension of the crude feed. Typically, the blunged suspension will contain about 60% to about 70% solids. However, blunging could be carried out in as low as 20% solids.

Initially and during blunging, the pH of the slurry will typically be in the range of from about 4.0 to about 9.5, and from about 6.5 to about 8.0. In certain embodiments, the pH of the suspension will be adjusted during blunging typically to within about 0.5 pH units of neutral to aid in dispersion of the suspension. The pH may be adjusted by the addition of one or more pH adjusting agents. Acceptable pH adjusting agents include any known or after-discovered chemicals, gases, or other agents capable of bringing the pH to suitable levels. The pH adjusting chemicals include, but are not limited to, sodium, potassium, or ammonium hydroxides or carbonates, with certain embodiments using sodium hydroxide or sodium carbonate. Appropriate amounts of the pH adjusting agent may be added as needed to achieve the target pH, typically in the range of from about 0.5 to about 5.0 pounds per ton.

Dispersing agents may also be added during blunging to aid in forming the aqueous suspension. Suitable dispersing agents include any known or after-discovered dispersing agents capable of aiding deflocculation. Examples of such dispersing agents include sodium hexametaphosphate, tetra sodium polyphosphate, sodium silicates, sodium polyacrylate, sodium salts of polyacrlamide/acylate copolymers, or the ammonium or potassium salts thereof. Dispersing agents are typically added in a dose range of about 2 to about 10 pounds per ton of kaolin on a dry basis. In certain embodiments, the dose range is from about 3 to about 6 pounds per ton.

The primary product (or products) may be formed by subjecting the suspension to classification, or a combination of classification and grinding. The primary product(s), classified to meet the p.s.d. percent less than 2 µm described above, may then be subjected to selective flocculation.

Selective flocculation reduces the concentration of titania, iron, and other impurities, and improves product brightness. Selective flocculation can be achieved by forming a dispersed, aqueous suspension of a blunged crude kaolin feed, an intermediate kaolin product, or the above-mentioned primary kaolin product. The suspension may then be diluted, preferably to a specific gravity of from about 1.020 to about 1.100. The pH of the diluted suspension may then be adjusted to from about 9.5 to about 11.5 using a pH adjusting agent. Suitable pH adjusting agents include any known or after-discovered chemicals, gases, or other agents capable of bringing the pH to within the stated range. Examples of such pH adjusting agents include ammonia, or hydroxides or carbonates of sodium, potassium, or ammonium, with ammonia or sodium hydroxide used in particular embodiments.

A flocculating polymer may be added to the suspension to aid in flocculation. Suitable flocculating polymers include Nalco 9877 selective flocculation polymer (a polyacrylate polyacrylamide copolymer available from Ondeo Nalco Company).

The flocculated kaolin is then allowed to separate from the dispersed impurities. The separation may take place in a thickener, separator, or other suitable container.

The flocculated kaolin may then be redispersed to form a dispersed slurry. Redispersion advantageously involves exposing the flocculating polymer to chemical reaction with an oxidant, subjecting the flocculating polymer to mechanical shear, or a combination thereof, to help break up the polymer. Suitable oxidants include, but are not limited to, hydrogen peroxide and ozone.

The selectively flocculated kaolin may then be defined. Defining typically involves diluting the redispersed slurry to about 30% solids, then passing the slurry through suitable particle size separation equipment to achieve a defined product. Suitable particle size separation equipment are well known to those of ordinary skill in the art and include, but are not limited to, disc-nozzle centrifuges and/or solid bowl decanters capable of separating particles finer than about 0.5 µm from the product.

The defined product just described may optionally and advantageously be subjected to one or more further beneficiation procedures, either before or after selective flocculation and defining. The defined product is subjected to further beneficiation procedures prior to selective flocculation to further improve brightness and to remove impurities as necessary. Such additional beneficiation procedures may include degritting, magnetic separation, flotation, classification, grinding, or a combination of two or more of these, to remove iron-and/or titanium-containing (and/or other) impurities, and/or reductive bleaching, to remove or brighten iron based (and/or other) impurities.

Suitable magnetic separators are well known to those having ordinary skill in the art and include any commercial or proprietary "high intensity" magnetic separator, preferably with a minimum applied field strength of 0.5 tesla. Typical equipment includes the Carpco reciprocating magnet or a PEM HIMS (High Intensity Magnetic Separator). Permanent magnet, copper coil electromagnet, or superconducting magnet systems can be beneficially employed.

Flotation and classification may be achieved by means well known to those of ordinary skill in the art.

Degritting may be achieved by means well known to those of ordinary skill in the art.

Grinding may be achieved with the use of any grinding equipment, which equipment is well known to those of ordinary skill in the art. Suitable grinders include, but are not limited to, Denver attrition scrubber, Drias mill, Netsch mill, Matter mill, and vibo-energy grinders.

Reductive bleaching agents include sodium hydrosulfite (hydros) in a dose range about 0.5 to about 5 pounds per ton of kaolin, with certain embodiments containing less than about 4 pounds per ton, on a dry basis. However, any other suitable reductive bleaching agent, such as formamidine sulphinic acid, may be employed. Reductive bleaching using hydros is preferably carried out in acidic pH. The pH is typically in the range of about 2.0 to about 4.5. Any mineral or organic acid or alum solution can be used to adjust the pH to the required value. Such pH modifiers include sulfuric acid, with pH of from about 2.5 to about 3.5, and alum solution, with pH of from about 3.5 to about 4.5. In both cases, sodium hydrosulfite is a suitable reductive bleaching agent. The kaolin slurry is mixed with the chosen acidifying agent to bring the pH to the chosen value, as dictated by kinetics and other considerations.

The beneficiated kaolin product may then be advantageously filtered and redispersed to form an aqueous slurry. Suitable dispersion agents include any known or after-discovered dispersion agent, such as sodium polyacrylate, sodium hexametaphosphate, tetra-sodium polyphosphate, or the like. The pH of the dispersed slurry may be returned to neutral, typically to within about 0.5 pH units of neutral, using one of the aforementioned pH adjusting agents.

The refined, neutral product is then subjected to evaporation or spray-drying as necessary, and its solids level adjusted according to market needs or other specifications.

The products of the above described process may be a hydrous kaolin pigment having the stated characteristics.

The kaolin pigments of the invention may, as previously indicated, be used as paper coatings and/or fillers. Notwithstanding the advantages of achieving high brightness without the use of calcium carbonates, the present invention encompasses paper coating and filler compositions comprising the kaolin pigments of the present invention alone, or together with other pigments. Other pigments include, but are not limited to, titanium dioxide, talc, calcined and other kaolins, and calcium carbonate. Ancillary ingredients for coating and filler compositions may comprise a coating base and are selected according to use. Ingredients suitable for a coating base are well known to those of ordinary skill in the art and include, but are not limited to, talc, synthetic plastic pigments, sodium alumina silicate, and calcined kaolins and other hydrous kaolins. Ancillary ingredients useful in coating bases may include suitable polymeric materials, which can be added to help retain the pigments in cellulose web formation, cellulose fibers, sizing agents, and coated or uncoated recycled broke fibers and the like.

A typical coating formulation may include, for example, in addition to about 100 parts pigment, a coating base comprising about 5 to about 20 parts binder, such as latex, starch, polyvinyl alcohol, or a combination thereof. Paper coating compositions may also include other ingredients known to those of ordinary skill in the art, including, but not limited to, co-binders, cross-linking agents, water retention aids, rheology modifiers, optical brightening agents, and/or optical brightening agent carriers, or mixtures of two or more of such ingredients.

The coating and filler compositions of the present invention may be used to coat or fill any suitable cellulose-based substrate. Such substrates include, but are not limited to, wood-containing or wood-free sheets, typically coated grades, which grades are familiar to those of ordinary skill in the art. Fillers comprising the inventive pigments may be used in, for example, supercalandered paper, newsprint, directory grades, uncoated freesheet, and coating basestock. The coating composition may be applied to the substrate using one of many methods available for coating paper. Typically, an excess of coating composition is applied either to the substrate itself or to an application roll or other apparatus. The applied coating may be metered, typically using a rod or blade, to achieve the desired coat weight on the paper.

Suitable cellulose-based substrates that may be coated or filled with the pigments of the present invention include, but are not limited to, lightweight coated (LWC) paper, and ultra lightweight coated (ULWC) paper. Lightweight coated, or LWC, paper is generally used for printing magazines, catalogues and advertising or promotional material. LWC paper coated to a weight of from about 5 g/m$^2$ to about 13 g/m$^2$ on each side, and the total grammage, or weight per unit area of the coated paper, is generally in the range of from about 49 g/m$^2$ to about 65 g/m$^2$. The coating may conveniently be applied by means of a coating machine that includes a short dwell time coating head. This is a device in which a captive pond of coating composition under a slightly elevated pressure is held in contact with a moving paper web for a time in the range of from 0.0004 second to 0.01 second, before excess coating composition is removed by means of a trailing blade. However, other types of coating apparatus may also be used for preparing lightweight coated paper.

The coated paper is required to meet certain standards of surface gloss and smoothness. For example, the paper is generally required to have a gloss value of at least about 32, and up to about 60, TAPPI units, and a Parker Print Surf value in the range of from about 0.5 to about 1.6 μm.

Ultra lightweight coated, or ULWC, paper, sometimes otherwise known as light lightweight coated (LLWC) paper, is generally used for catalogues and for advertising and promotional material sent through the mail to reduce mailing costs. The coating weight is generally in the range of from 5 g/m$^2$ to 7 g/m$^2$ per side. The grammage is generally in the range of from about 35 g/m$^2$ to about 48 g/m$^2$.

Substrates, such as paper, filled or coated to various weights such as those described above with compositions comprising the inventive pigments exhibit exceptional brightness, and may exhibit improved fluorescence, good opacity, gloss, and other desirable characteristics. Pigments of the invention unexpectedly exhibit an increase of up to about 2 to about 3 GE Brightness units. Consequently, paper coated or filled with pigments of the invention unexpectedly exhibit a corresponding increase in brightness. The inventive pigments also may exhibit improved opacity of up to about 0.5 units, improved CIE whiteness values and/or improved fluorescence values than that which could be achieved using previously available commercial high brightness Brazilian kaolins (such as those listed in Table 1, below) of otherwise identical formulation. The inventive pigments exhibit these improvements while maintaining satisfactory levels of smoothness, gloss, printing properties, and other desirable properties. They also reduce or eliminate the need to add additional brightness enhancing pigments that require different pH operating conditions.

Figure 2:
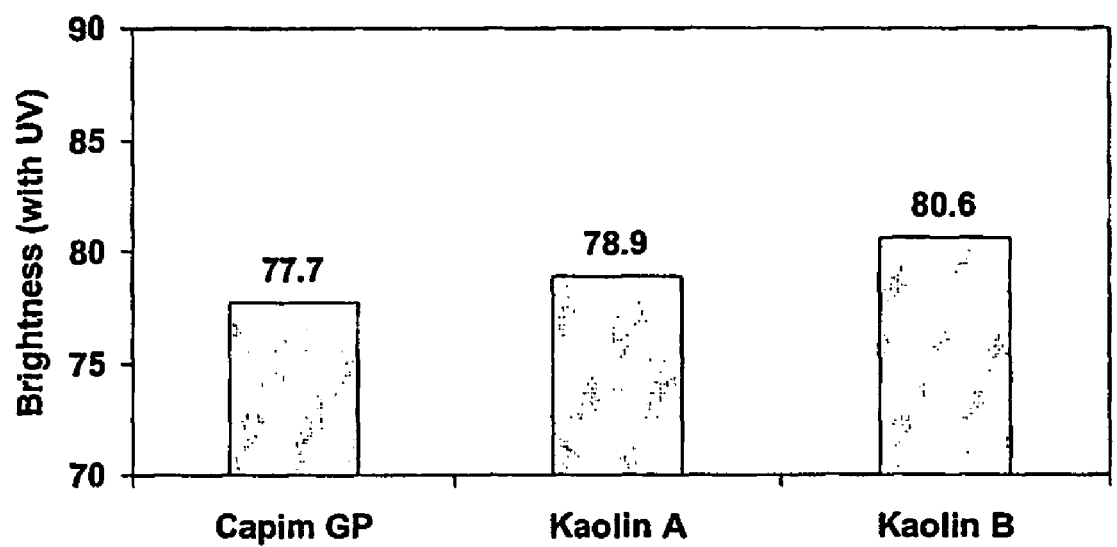
FIG. 2 depicts a comparison of paper Brightness (GE) values for papers coated with a prior art Brazilian kaolin pigment (Capim GP) and a pigment of the present invention of comparable particle size distribution.

FIGS. 1 and 2 illustrate a comparison of pigment and paper brightness levels, respectively, between the inventive pigments and a commercially available prior art Brazilian pigment, Capim GP, available from Imerys. FIGS. 1 and 2 also show the unexpectedly large improvement of selective flocculation on pigment and paper brightness, respectively, when pigments of the invention are subjected to this beneficiation procedure, described above.

TABLE 1

| Previously Available Commercial Brazilian Pigment | Brightness (GE) | Steepness | Average TiO$_2$ Content (Wt. %) |
| --- | --- | --- | --- |
| Capim DG* | 91 | 38 | 0.60% |
| Capim GP* | 91 | 33 | 0.58% |
| Capim NP* | 91 | 32 | 0.52% |
| Capim CC* | 89.5 | 19 | 0.66% |
| Century** | 90 | 33 | 0.78% |

*Available from Imerys, Inc., made from Rio Capim crude.
**Available from Para Pigmentos, S.A., made from Rio Capim crude.

EXAMPLE 1

A crude Rio Capim kaolin clay was blunged with water, a pH adjusting chemical, and a dispersant chemical. The pH was adjusted to above 6.5 and a dispersant added to the feed clay to form a dispersed aqueous suspension of the kaolin particulate material. The dispersed aqueous suspension was degritted to remove sand-sized impurities contained within the suspension. The dispersed, degritted suspension was then subjected to scrub grinding and subsequently high intensity wet magnetic separation to remove iron—and titanium—bearing minerals. The magnet product slip was then blended with 6% centrifuge coarse fractions. The blended product was then ground to delaminate kaolinite stacks into kaolinite plates. The product was then fractionated using a solid bowl decanter centrifuge to remove the coarser size particles of kaolin greater than about 2.0 microns. This product was set aside for blending back with the magnet product. The product was then conditioned by aging and dilution, and its pH level adjusted for selective flocculation. A Nalco 9877 selective flocculation polymer was added, followed by separation in a thickener into a lower flocculated product layer and an upper dispersed impurity layer. The flocculated product was then subjected to ozonation and water added to fractionate and break down the flocs, yielding a dispersed post-ozonation product. The product was then subjected to de-fining using a disc nozzle centrifuge to remove particles less than 0.3 µm, then to reduced-acid leaching to remove iron oxide impurities, filtration, and the slurry was dewatered using an evaporator. While not used in this example, a spray-dry back-mix can be used to dewater the slurry. The filter cake product was then re-dispersed to a fluid slip of kaolin particles. In the re-blunger, soda ash (sodium carbonate) and a dispersant (sodium polyacrylate C-211 supplied by Vinnings Industries Inc.) were added. Water was then removed from the mineral slurry, providing a product that could be transported in a slurry form at high solids (70%) or in dried solid form. The properties of the product pigment are as listed in Table 2, below.

EXAMPLE 2

Two different coating compositions, one comprising the inventive pigment made from Rio Capim clay, and one comprising Capim GP pigment (pigment having GE Brightness of 90.6 and a steepness value of 34), of otherwise identical formulation were made in the manner described in Example 1. Each of the two coating compositions were coated onto two pieces of typical light weight coating (LWC) offset (magazine) basepaper. The same reel of basepaper was used in both instances. The basepaper was produced on a commercial paper machine running under acid conditions and a typical coating formulation used for the production of this type of paper applied using a laboratory Helicoater™. The coated paper was then calendered using a laboratory supercalender. Selected pigment and coated paper properties are as reported in Table 2.

TABLE 2

| Selected Pigment and Coated Paper Properties | High Brightness Brazilian Kaolin | Inventive Kaolin Pigment |
| --- | --- | --- |
| Pigment Brightness (GE) | 90.7 | 93.2 |
| Particle Size: % <2 µm | 86 | 89 |
| Particle Size: % <0.25 µm | 18 | 7 |
| Pigment Steepness (d$_{30}$/d$_{70}$ × 100) | 34 | 45 |
| TiO$_2$ content (wt. %) | 0.55 | 0.17 |
| Coating Color Solids (%) | 63 | 62 |
| Coated Paper Brightness (without UV) | 75.3 | 77.5 |
| Coated Paper Brightness (with UV) | 77.7 | 80.7 |
| Fluorescence | 2.4 | 3.2 |
| CIE Whiteness | 75 | 84 |
| Opacity | 93.5 | 94.0 |
| Paper Gloss | 80 | 78 |

EXAMPLE 3

A kaolin produced in accordance with the general process described above was formulated for comparison to a commercial high brightness Brazilian kaolin (Capim GP, Imerys). The pigments were coated onto a typical LWC offset (magazine) basepaper, using a laboratory Helicoater™ and a coating formulation comprising ancillary ingredients typically used for producing this type of paper. The coated paper was then calendered using a laboratory supercalender. Selected pigment and coated paper properties are as reported in Table 3.

TABLE 3

| | High Brightness Brazilian Kaolin | Inventive Kaolin Pigment |
| --- | --- | --- |
| Pigment Brightness (GE) | 91.1 | 93.1 |
| Particle Size: % <2 µm | 83 | 85 |
| Particle Size: % <0.25 µm | 14 | 6 |
| Pigment Steepness | 35 | 41 |

TABLE 3-continued

|  | High Brightness Brazilian Kaolin | Inventive Kaolin Pigment |
|---|---|---|
| ($d_{30}/d_{70}$ × 100) |  |  |
| TiO$_2$ content (wt. %) | 0.58 | 0.16 |
| Coating Color Solids (%) | 62.6 | 61.4 |
| Coated Paper Brightness (without UV) | 75.5 | 77.5 |
| Coated Paper Brightness (with UV) | 78.1 | 80.6 |
| Fluorescence | 2.6 | 3.1 |
| CIE Whiteness | 77 | 84 |
| Opacity | 93.7 | 93.9 |
| Paper Gloss | 80 | 79 |

EXAMPLE 4

A kaolin was produced using the above described process and compared with a commercial high brightness kaolin (Capim GP). The pigment was coated onto a typical LWC offset (magazine) basepaper, using a laboratory Helicoater™ and a coating formulation comprising ancillary ingredients typically used for the production of this type of paper. The coated paper was then calendered using a laboratory supercalender. The results are as listed in Table 4.

TABLE 4

|  | High Brightness Brazilian Kaolin | Inventive Kaolin Pigment |
|---|---|---|
| Pigment Brightness (GE) | 91.1 | 93.2 |
| Particle Size: % <2 μm | 83 | 89 |
| Particle Size: % <0.25 μm | 14 | 7 |
| Pigment Steepness ($d_{30}/d_{70}$ × 100) | 35 | 44 |
| Coating Color Solids (%) | 62.6 | 62.2 |
| TiO$_2$ Content (wt. %) | 0.58 | 0.17 |
| Coated Paper Brightness (without UV) | 75.5 | 77.5 |
| Coated Paper Brightness (with UV) | 78.1 | 80.7 |
| Fluorescence | 2.6 | 3.2 |
| CIE Whiteness | 77 | 84 |
| Opacity | 93.7 | 94.0 |
| Paper Gloss | 80 | 78 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hydrous kaolin pigment having a GE Brightness of at least about 90.0 and a steepness ($d_{30}/d_{70}$×100) of at least about 39.

2. A hydrous kaolin pigment of claim 1, wherein said GE Brightness is at least about 91.0.

3. A hydrous kaolin pigment of claim 2, wherein said GE Brightness is at least about 92.0.

4. A hydrous kaolin pigment of claim 3, wherein said GE Brightness is at least about 93.5.

5. A hydrous kaolin pigment of claim 4, wherein said GE Brightness is at least about 94.0.

6. A hydrous kaolin pigment of claim 1, wherein said steepness ranges from about 39 to about 45.

7. A hydrous kaolin pigment of claim 6, wherein said steepness ranges from about 41 to about 45.

8. A hydrous kaolin pigment of claim 1, having a particle size distribution such that about 80% to about 94% by weight are less than 2 μm.

9. A hydrous kaolin pigment of claim 8, wherein said particle size distribution is such that about 85% to about 92% by weight are less than 2 μm.

10. A hydrous kaolin pigment of claim 9, wherein said particle size distribution is such that about 85% to about 90% by weight are less than 2 μm.

11. The hydrous kaolin pigment of claim 1, having a GE Brightness of at least about 92.0, and a titania concentration of less than or equal to about 0.35%.

12. A hydrous kaolin pigment of claim 11, wherein said titania concentration is less than or equal to about 0.30%.

13. A hydrous kaolin pigment of claim 12, wherein said titania concentration is less than or equal to about 0.20%.

14. A hydrous kaolin pigment of claim 11, wherein said GE Brightness is at least about 93.0, and said titania concentration is less than or equal to about 0.15%.

15. The hydrous kaolin pigment of claim 1, having a GE Brightness of at least about 91.5, having a titania concentration less than or equal to about 0.40% by weight of the pigment on a dry basis, and having a particle size distribution such that about 80% to 94% by weight are less than 2 μm.

16. A hydrous kaolin pigment of claim 15, having a particle size distribution such that about 2% to about 15% by weight are less than 0.25 μm.

17. A hydrous kaolin pigment of claim 15, wherein said particle size distribution is such that about 85% to about 92% by weight are less than 2 μm.

18. A hydrous kaolin pigment of claim 17, wherein said particle size distribution is such that about 2% to about 10% by weight are less than 0.25 μm.

19. A hydrous kaolin pigment of claim 17, wherein said particle size distribution is such that about 85% to about 90% by weight are less than 2 μm.

20. A hydrous kaolin pigment of claim 17, wherein said particle size distribution is such that about 2% to about 8% is less than 0.25 μm.

21. A hydrous kaolin pigment of claim 15, having a GE Brightness of at least about 92.0.

22. A hydrous kaolin pigment of claim 21, having a GE Brightness of at least about 93.0.

23. A paper coating or filler composition comprising a hydrous kaolin pigment of claim 1 and a coating base.

24. A paper coating or filler composition comprising a hydrous kaolin pigment of claim 7 and a coating base.

25. A paper coating or filler composition comprising a hydrous kaolin pigment of claim 11 and a coating base.

26. A paper coating or filler composition comprising a hydrous kaolin pigment of claim 21 and a coating base.

27. A hydrous kaolin pigment produced by a process comprising: (a) forming an aqueous suspension of a hydrous kaolin clay; (b) forming a primary product by subjecting the suspension to classification or a combination of classification and grinding; (c) separating the kaolin from impurities by selective flocculation; and (d) defining the separated kaolin, wherein the product of the process is a hydrous kaolin pigment having a GE Brightness of at least about 90.0 and a steepness ($d_{30}/d_{70}$×100) of at least about 39.

28. The hydrous kaolin pigment of claim 27, having a GE Brightness of at least about 91.5 and a titania concentration of less than or equal to about 0.40% by weight of the pigment on a dry basis.

29. The hydrous kaolin pigment of claim 27, having a GE Brightness of at least about 93.5.

30. The hydrous kaolin pigment of claim 27, wherein said separating step includes the steps of flocculating the kaolin away from dispersed impurities and redispersing the flocculated kaolin.

31. The product of the process hydrous kaolin pigment of claim 30, wherein said redispersion involves reaction with an oxidant, mechanical shear, or both.

32. The hydrous kaolin pigment of claim 27, wherein said primary product is subjected to at least one additional beneficiation procedure prior to selective flocculation.

33. The hydrous kaolin pigment of claim 32, wherein said at least one additional beneficiation procedure is degritting, magnetic separation, flotation, classification, grinding, reductive bleaching, or a combination thereof.

34. The hydrous kaolin pigment of claim 31, wherein said oxidant is selected from hydrogen peroxide or ozone.

35. The hydrous kaolin pigment of claim 34, wherein said oxidant is ozone.

36. A cellulose based substrate coated or filled with a composition comprising a pigment according to any one of claims 1, 11, or 15.

37. A coated or filled cellulose based substrate according to claim 36, wherein said substrate is paper.

38. A coated or filled cellulose based substrate according to claim 37, wherein said paper is light weight coating basepaper.

* * * * *

UNITED STATES PATENT AND TRADEMARK OFFICE
CERTIFICATE OF CORRECTION

PATENT NO. : 7,306,668 B2 Page 1 of 1
APPLICATION NO. : 10/508831
DATED : December 11, 2007
INVENTOR(S) : Graham Pring and Christopher R. L. Golley It is certified that error appears in the above-identified patent and that said Letters Patent is hereby corrected as shown below:

Col. 13, line 7, claim 31: After "The," delete "product of the process".

Signed and Sealed this

Sixth Day of May, 2008

JON W. DUDAS
*Director of the United States Patent and Trademark Office*